United States Patent
Ahmed

(10) Patent No.: US 10,051,085 B2
(45) Date of Patent: Aug. 14, 2018

(54) SYSTEM AND METHOD OF DATA AND COMMAND REQUEST PROCESSING

(71) Applicant: Verizon Patent and Licensing Inc., Basking Ridge, NJ (US)

(72) Inventor: Z. Shameel Ahmed, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

(21) Appl. No.: 14/283,315

(22) Filed: May 21, 2014

(65) Prior Publication Data

US 2015/0341292 A1    Nov. 26, 2015

(51) Int. Cl.
*H04L 29/06* (2006.01)
*H04L 12/58* (2006.01)

(52) U.S. Cl.
CPC ............ *H04L 67/42* (2013.01); *H04L 12/58* (2013.01); *H04L 51/02* (2013.01); *H04L 51/18* (2013.01); *H04L 67/40* (2013.01)

(58) Field of Classification Search
None
See application file for complete search history.

(56) References Cited

U.S. PATENT DOCUMENTS

| | | | | |
|---|---|---|---|---|
| 6,449,343 B1* | 9/2002 | Henderson | ......... | H04M 3/5322 379/88.14 |
| 8,489,880 B1* | 7/2013 | Gagnon | ............... | H04L 9/3215 713/176 |
| 2002/0006790 A1* | 1/2002 | Blumenstock | ...... | G06F 11/2294 455/423 |
| 2002/0019851 A1* | 2/2002 | Pollack | ............. | G06F 17/30067 709/206 |
| 2004/0019643 A1* | 1/2004 | Zirnstein, Jr. | ........... | G06F 9/546 709/206 |
| 2008/0162923 A1* | 7/2008 | Arnold | ................. | G06Q 10/107 713/150 |
| 2010/0070419 A1* | 3/2010 | Vadhri | ................. | G06Q 10/107 705/71 |
| 2011/0119336 A1* | 5/2011 | Chakravarthy | ....... | G06F 9/4843 709/206 |
| 2012/0054289 A1* | 3/2012 | Aytulu | ................. | G06Q 10/107 709/206 |

(Continued)

*Primary Examiner* — Philip Chea
*Assistant Examiner* — Hassan Khan

(57) ABSTRACT

Methods and systems are disclosed for processing data and command requests. In one aspect, a method for processing a data and command request is disclosed that includes receiving, at a server, a first electronic mail message from a requesting electronic mail address, the first electronic mail message including information that identifies an application. The method may also include transmitting, by the server, a query to an application data source associated with the application, the application data source being selected from a plurality of data sources associated with a plurality of applications and receiving, at the server, application data from the application data source. In addition, the method may also include transmitting, by the server, a second electronic mail message that includes at least some of the application data as a reply to the first electronic mail message. Systems and computer-readable media are also disclosed for implementing the above-described method.

20 Claims, 7 Drawing Sheets

(56) References Cited

U.S. PATENT DOCUMENTS

2013/0304834 A1* 11/2013 Jayaseelan .............. H04L 67/32
709/206
2014/0195628 A1* 7/2014 Church .................. H04L 51/38
709/206

* cited by examiner

600

AAA JOBDETAILS (TechID=T00001; Date=6/27/2013) REPLYTO=other@verizon.com
Remote Request Response Server
Sent: Mon 7/15/2013 4:58 PM
To: requester@verizon.com

| Job ID | Status | Departure Date | Arrival Date | Job Type | Minutes |
|---|---|---|---|---|---|
| 12 | COMPLETE | 6/27/2013 10:57 AM | 6/27/2013 11:57 AM | SPECIAL-Inst | 60 |
| 23 | INCOMPLETE | 6/27/2013 02:57 PM | 6/27/2013 03:17 PM | SPECIAL-Inst | 20 |

Figure 6

SYSTEM AND METHOD OF DATA AND COMMAND REQUEST PROCESSING

TECHNICAL FIELD

The present disclosure generally relates to methods and systems for processing data and command requests. For example, methods and systems are disclosed for processing data and command requests using electronic mail ("email") communication and other forms of electronic communication (e.g., text message communication).

BACKGROUND

Software applications often cause large amounts of data to be generated or collected. Often, one or more users or devices may wish to view or access the stored application data. For example, in a business setting, software may be used that collects and/or generates various types of data. For example, data may be collected or generated regarding the status of jobs (e.g., whether a job performed by a technician is complete or incomplete), billing information, customer address information, etc. A user, such as a supervisor or technician, may wish to retrieve application data for any number of reasons. For example, a supervisor may wish to determine whether a technician has completed all pending jobs.

Existing systems often use cumbersome and limited techniques to enable users to access stored application data. For example, in some systems, a user may access stored application data by executing an application that generated or collected the data. Oftentimes, however, a user may not have access to the device capable of executing the application that generated or collected the data. For example, the device executing the application may be located in a secure facility, or only select individuals may have access to the device that can execute the application.

SUMMARY

Embodiments consistent with the present disclosure provide systems and methods for processing data and command requests.

The disclosed embodiments include a method for processing a data and command request. The method includes receiving, at a server, a first electronic mail message from a requesting electronic mail address, the first electronic mail message including information that identifies an application. In some embodiments, the first electronic mail message further includes one or more application commands and one or more command parameters. The method further includes transmitting, by the server, a query to an application data source associated with the application, the application data source being selected from a plurality of data sources associated with a plurality of applications based on the information in the first electronic mail message that identifies the application. In some embodiments, the query is generated based on the one or more application commands and one or more command parameters. The method further includes receiving, at the server, application data from the application data source. In addition, the method further includes transmitting, by the server, a second electronic mail message that includes at least some of the application data as a reply to the first electronic mail message.

Disclosed embodiments also include a system for processing a data and command request. The system may include at least one processor and at least one memory device. The memory device may include instructions that, when executed by the at least one processor, configure the at least one processor to receive a first electronic mail message from a requesting electronic mail address, the first electronic mail message including information that identifies an application, transmit a query to an application data source associated with the application, the application data source being selected from a plurality of data sources associated with a plurality of applications based on the information in the first electronic mail message that identifies the application, receive application data from the application data source, and transmit a second electronic mail message that includes at least some of the application data as a reply to the first electronic mail message Disclosed embodiments also include a method for processing a data and command request that includes transmitting, by a device, a first electronic mail message to a server, the electronic mail message including request data that includes information that identifies an application and receiving, at the device, a second electronic mail message from the server, the second electronic mail message including application data from an application data source selected by the server from a plurality of data sources associated with a plurality of applications.

Additional aspects related to the disclosed embodiments will be set forth in part in the description which follows, and in part will be understood from the description, or may be learned by practice of the disclosed embodiments.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 6 is a graphical illustration of an example electronic mail message containing a data reply, consistent with disclosed embodiments.

DETAILED DESCRIPTION

Reference will now be made in detail to some exemplary embodiments, illustrated in the accompanying drawings. Wherever possible, the same reference numbers will be used throughout the drawings and disclosure to refer to the same or like parts.

Some embodiments of this disclosure enable a data and command request to be processed via email communication with minimal involvement of a user submitting the data and command request. In some embodiments, a user sends an email associated with a data and command request to a server. The server may be configured to process the email and extract information identifying an application relating to the data and command request. For example, as explained in detail below, the email may be structured in a manner that assists the server in determining the application relating to the data and command request. The server may be configured to access a plurality of data sources associated with a plurality of applications. In some embodiments, the server may transmit a query to a data source associated with the application relating to the user's data and command request. The data source may send the server a reply containing data responsive to the query, which then may be sent by the server back to the user via email communication.

Figure 1:
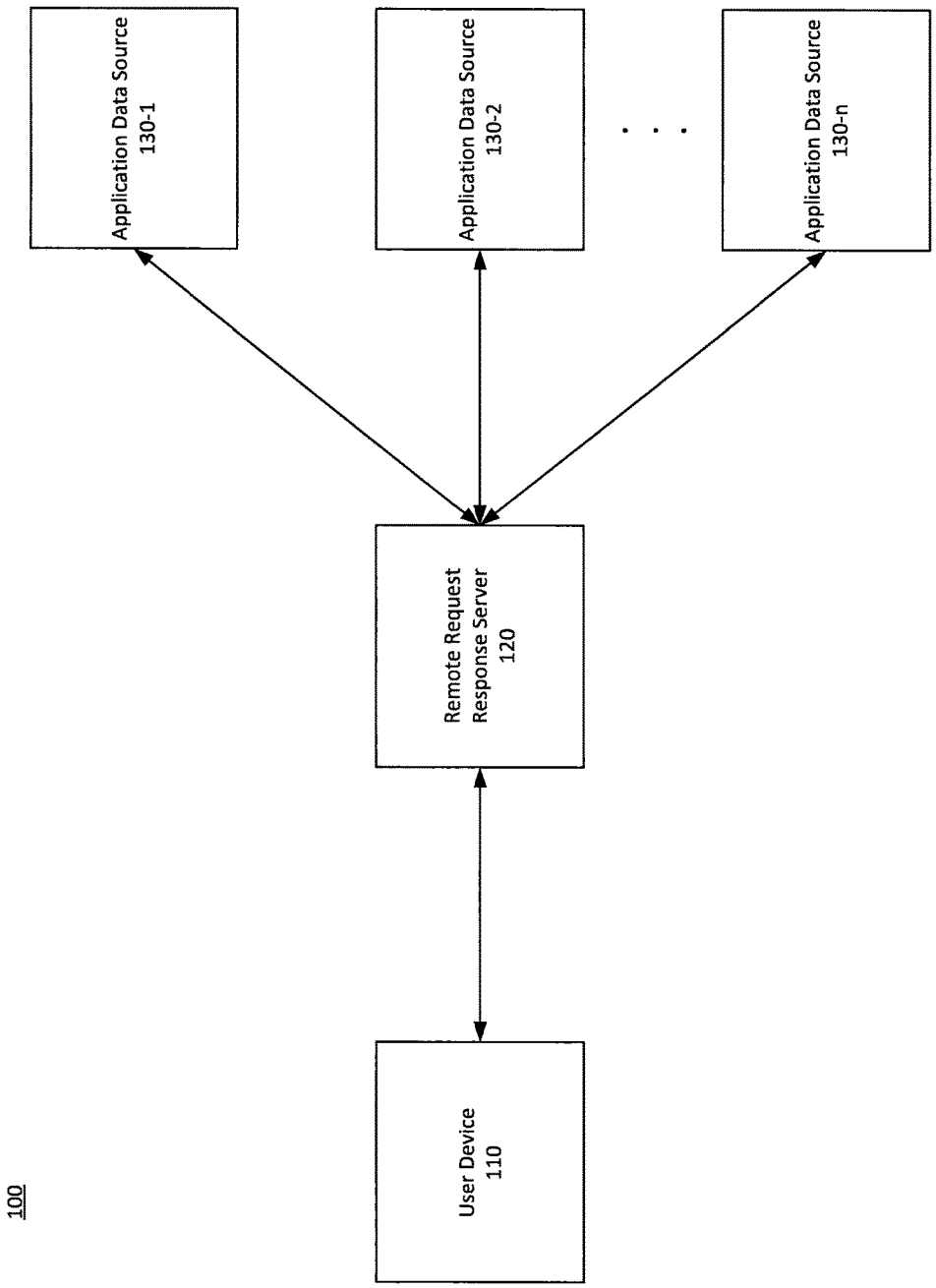
FIG. 1 is a diagram showing the connections between a user device, a remote request response server, and application data sources, consistent with disclosed embodiments.

FIG. 1 is a diagram of an example system 100 for processing a data and command request. System 100 may include, among other things, at least one user device 110, at least one remote request response server 120, and at least one application data source 130. For exemplary purposes, FIG. 1 depicts one user device 110, one remote request response server 120, and a plurality of application data sources 130-1, 130-2, and 130-n. In other embodiments, a plurality of user devices 110 may be present, a plurality of remote request response servers 120 may be present, and/or only one application data source 130 may be present. For example, a single user device 110 may be connected to a single remote request response server 120, a single user device 110 may be connected to a plurality of remote request response servers 120, a plurality of user devices 110 may be communicatively connected to a single remote request response server 120, a plurality of user devices 110 may each be communicatively connected to a plurality of remote request response servers 120, or a plurality of user devices 110 may each be communicatively connected to one of a plurality of remote request response servers 120. In addition, for example, a single remote request response server 120 may be connected to a single application data source 130, a single remote request response server 120 may be connected to a plurality of application data sources 130, a plurality of remote request response servers 120 may be communicatively connected to a single application data source 130, a plurality of remote request response servers 120 may each be communicatively connected to a plurality of application data sources 130, or a plurality of request response servers 120 may each be communicatively connected to one of a plurality of application data sources 130. The connections between the user devices 110, remote request response servers 120, and application data sources 130 may be wired connections, wireless connections, or a combination of both. Moreover, user devices 110, remote request response servers 120, and application data sources 130 may communicate using any means of sending and receiving data, such as, for example, the Internet protocol.

User device 110 may be, for example, a desktop computer, a laptop computer, a tablet, cellular phone, or any other device capable of transmitting data to, and receiving data from, a network such as the Internet. In some embodiments, user device 110 is configured in accordance with device 700, which is described in more detail below with respect to FIG. 7.

In some embodiments, user device 110 is configured to access or execute email client software. The email client software may include for example, a display module for providing a user with an interface to input data (e.g., for the creation of an email) and view data (e.g., to view received emails), a transmitting module for sending emails, and a receiving module for receiving emails. The display module may include, for example, code for generating a user interface in accordance with the interface described below with respect to FIG. 4. The transmitting module may, for example, facilitate transmission of email in accordance with the simple mail transfer protocol (SMTP), or some other protocol or standard, to a recipient email address, either directly or via a mail server. The receiving module may include, for example, code for receiving emails in accordance with the SMTP, the post office protocol (e.g., POP3), the internet message access protocol (IMAP), or any other means.

In some embodiments, user device 110 stores email client software that may be executed by one or more processors of user device 110. As another example, user device 110 may receive email client software from a remote source, such as a server, that is then executed by one or more processors of user device 110. As another example, email client software may be stored and executed by a device different than user device 110, such as a remote server; user device 110 may be configured to receive data from the remote server (e.g., receive data regarding one or more user interfaces associated with the email client software) and send data to the remote server (e.g., send user selections associated with the one or more user interfaces of the email client software). For example, user device 110 may be configured to access a website that provides an email client.

Figure 4:
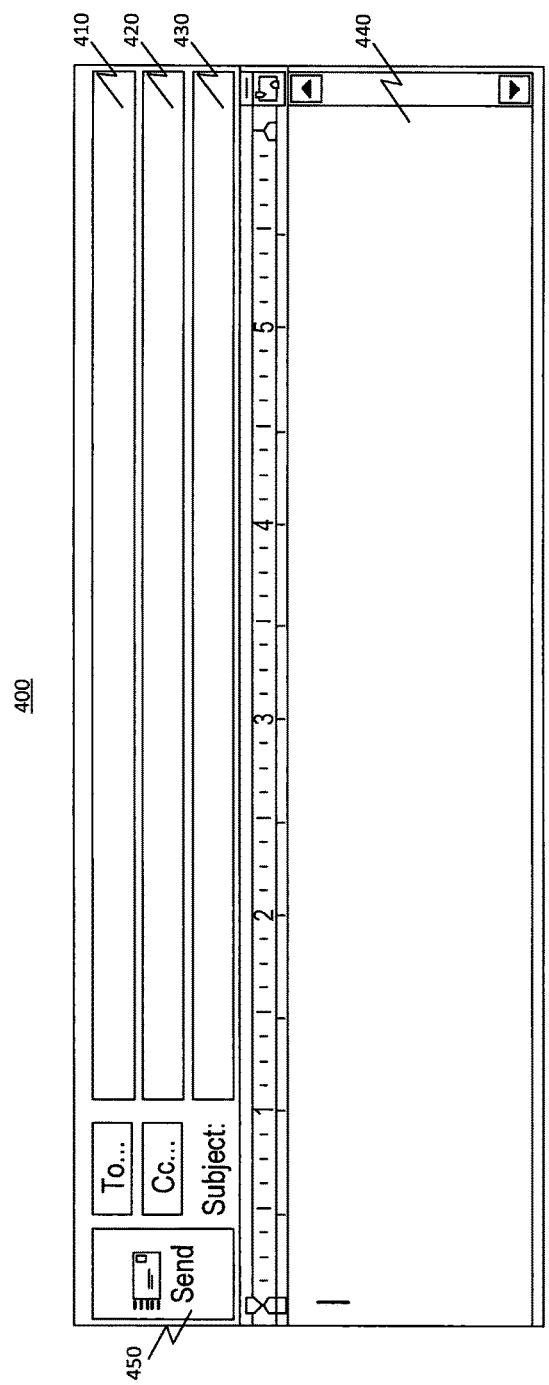
FIG. 4 is a graphical illustration of an example electronic mail message, consistent with disclosed embodiments.

The email client software, when executed (either on user device 110 or at a remote location), may cause the one or more processors of user device 110 to output a user interface to a display. FIG. 4 depicts one example of a user interface 400 of email client software. In some embodiments, the user interface shown in FIG. 4 is presented in response to, for example, a compose button selection detected by user device 110. As shown in FIG. 4, the user interface 400 may include, among other things, a recipient field 410, a carbon copy field 420, a subject field 430, a message body 440, and a send button 450. Recipient field 410 may be configured to receive text input associated with one or more email addresses of intended recipients of an email. Carbon copy field 420 may also be configured to receive text input associated with one or more email addresses of intended recipients of an email.

Subject field 430 may be configured to receive text representative of, for example, a title or other identification information associated with the email. In some embodiments, the email client software is configured to reject any data in the subject field 430 that is not plain text. However, in other embodiments, subject field 430 may be configured to receive formatted text. Message body 440 may be configured to receive plain text, formatted text (e.g., HTML formatted text), image data, and/or other forms of data.

The user interface of the email client software is not limited to what is depicted in FIG. 4. For example, the user interface of the email client software may include additional features and/or may exclude some features depicted in FIG. 4. For example, in some embodiments, the email client software may be configured to receive one or more file attachments. Moreover, in some embodiments, a carbon copy field 420 may be omitted and/or a blind carbon copy field may be included. Moreover, the location of various fields in the user interface is exemplary only.

The email client software may be configured to send an email in response to a selection of send button 450. The email may include, among other things, data representative of the information received in recipient field 410, carbon copy field 420, subject field 430, and/or message body 440.

The email client software may also be associated with an email address of a sender (e.g., an email address associated with user device 110). In some embodiments, an email generated using the email client software may include data representative of the email address of the sender.

Remote request response server 120 may be, for example, a computer executing web server software, a dedicated server, or any other device capable of transmitting data to, and receiving data from, a network such as the Internet. In some embodiments, remote request response server 120 is configured in accordance with device 700, which is described in more detail below with respect to FIG. 7. Similarly to the email client software described above, in some embodiments remote request response server 120 may receive emails in accordance with the SMTP, POP3, IMAP or other standard or protocol. Likewise, in some embodiments remote request response server 120 may include software that, when executed by a processor, enables the remote request response server 120 to transmit emails in accordance with SMTP.

As described in more detail below, remote request response server 120 may be configured to receive one or more emails at one more predefined email addresses. For example, remote request response server 120 may be configured to receive one or more emails from user device 110. Moreover, remote request response server 120 may be configured to send data to, and receive data from, at least one application data source 130. Remote request response server 120 may send data to, and receive data from, at least one application data source 130 using any means of communication, such as email communication or Internet Protocol communication. Application data source 130 may be any source of data regarding an application, such as a database or a web service exposed by an application.

In some embodiments, at least one application data source 130 may be part of remote request response server 120. However, one or more application data sources 130 may also, or alternatively, be external from remote request response server 120. For example, application data source 130-1 may be connected to a first computer executing a first application at a first location and application data source 130-2 may be connected to a second computer executing a second application at a second location. Application data sources 130 may be within the same network as remote request response server 120 or within a different network than remote request response server 120. In some embodiments, application data source 130 may be a memory device 730 of a device 700, which is described in more detail below with respect to FIG. 7.

Each application data source 130 may store data associated with at least one application. For example, application data source 130-1 may store data generated or obtained by a first application. In some embodiments, an entity responsible for maintaining an application associated with an application data source 130 may configure the application data source 130 to gather data in response to one or more commands. For example, application data source 130-1 may be configured to gather data in one or more ways in response to a first set of commands and application data source 130-2 may be configured to gather data in one or more ways in response to a second set of commands. The first set of commands and the second set of commands may be the same or may be different.

Figure 2:
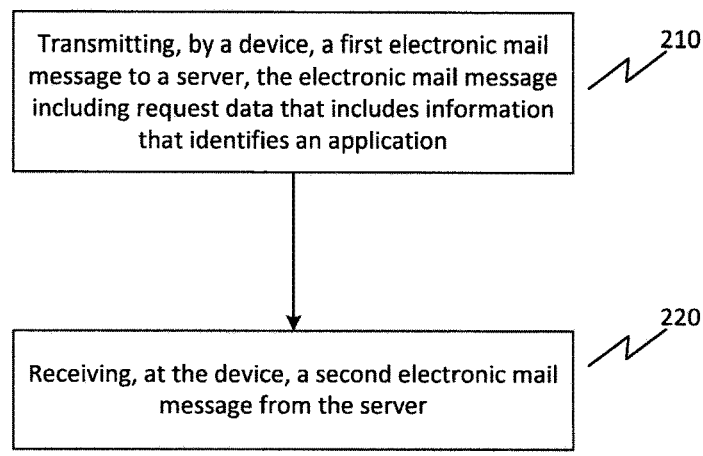
FIG. 2 is a flowchart showing an example process for processing a data and command request by a user device, consistent with disclosed embodiments.

FIG. 2 illustrates an example process 200 in accordance with some embodiments. Process 200 may be implemented by, for example user device 110. For example, user device 110 may be configured to perform the operations of process 200 by executing software or firmware stored in memory or by communicating with a remote email client that executes software or firmware stored in memory.

In some embodiments process 200 may include transmitting, by a device, a first electronic mail message to a server, the electronic mail message including request data that includes information that identifies an application (step 210). For example, user device 210 may be configured to transmit a first email that includes request data to remote request response server 120.

Figure 5:
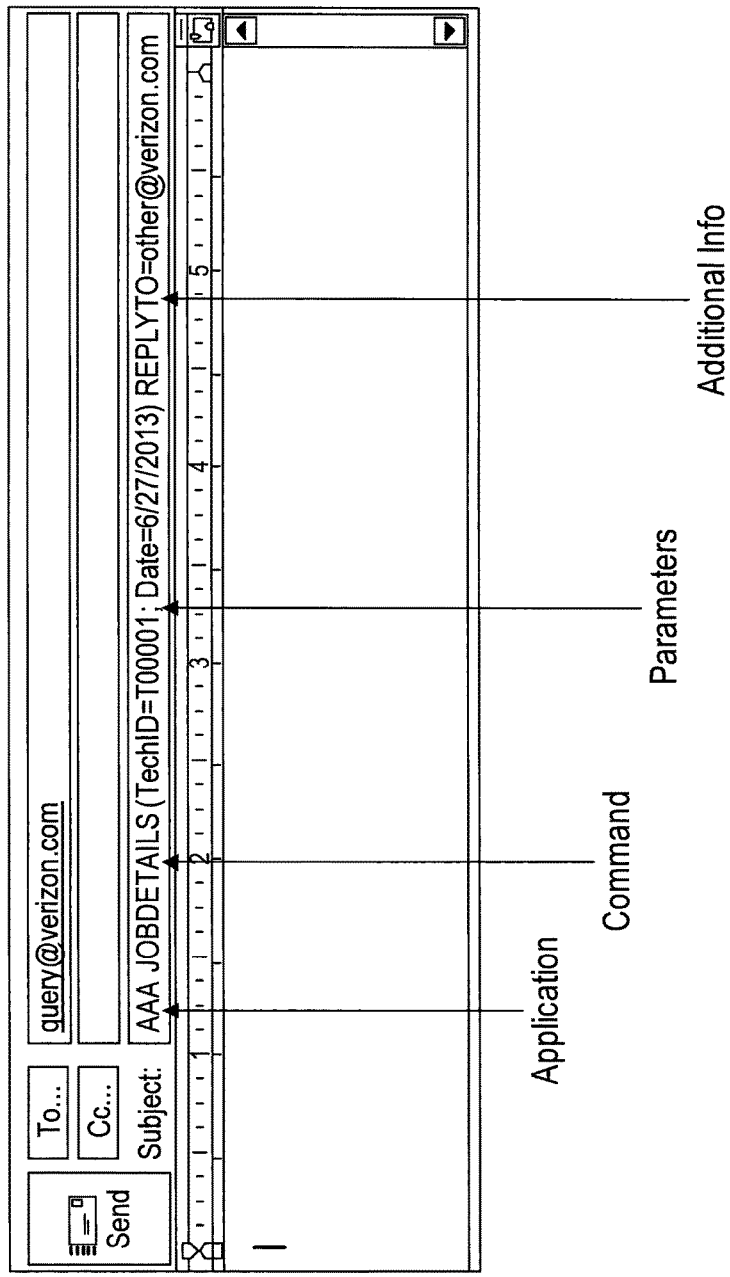
FIG. 5 is a graphical illustration of an example electronic mail message containing a data and command request, consistent with disclosed embodiments.

FIG. 5 depicts one example of a user interface 500 of email client software associated with the request data. In particular, user interface 500 depicts example request data entered into the user interface 500 prior to an email being sent to remote request response server 120. As shown in user interface 500, a predefined email address (e.g., "query@verzon.com") associated with remote request response server 120 may be entered into a recipient field of an email. In some embodiments, the predefined email address is stored on user device 110. For example, at an earlier time, user device 110 may receive the predefined email address from remote request response server 120 or from some other source. Moreover, in some embodiments, more than one predefined email address may be associated with remote request response server 120. For example, user device 110 may be assigned a unique predefined email address. For example, remote request response server 120 may be associated with a plurality of email address, each assigned to communicate with a different user device 110. As shown in FIG. 5, the carbon copy field may optionally be left blank. However, an email address may also be entered into the carbon copy field.

As shown in FIG. 5, in some embodiments the request data is entered into the subject field. The request data may include, for example, text data that identifies an application (e.g., application "AAA"). The identified application may be the application from which a user desires to obtain data. For example, data associated with the "AAA" application may be stored in application data source 130-1. Data associated with a different application (e.g., application "BBB") may be stored in application data source 130-2. Alternatively, data associated with the "AAA" application may also be stored in application data source 130-2. The request data may also include, for example a command (e.g., "JOB DETAILS"), one or more parameters (e.g., "TechID=T0001; Date=Jun. 27, 2013), and/or one or more other items of additional information (e.g., "REPLYTO:other@verizon.com").

The command may be indicative of, for example, a type of command to be performed by remote request response server 120 or application data source 130 to obtain data associated with the identified application. For example, as explained in more detail below, the "JOB DETAILS" command may be used to identify information regarding one or more jobs performed by a technician. Thus, for example, if a "JOB DETAILS" command is received, request response server 120 may be configured to only search for data that is annotated as being associated with technician jobs. Alternatively, if a "JOB DETAILS" command is received, application data source 130 may be configured to only search for data that is annotated as being associated with technician jobs. In other words, the command may influence how the request response server 120 accesses application data source 130, may influence how application data source 130 gathers data, or both. The identified command may require and/or may permit one or more parameters to influence the command. The "JOB DETAILS" command, for example, may be submitted with the parameters "TechID=T0001" and "Date=Jun. 27, 2013" to indicate that the technician job information should be limited to jobs performed on Jun. 27, 2013, by a technician associated with the technician ID "T0001".

The additional information may include, for example, an email address to receive any data responsive to the query (which may be an email address to receive the data instead of the sender email address, or may be an email address to receive the data in addition to the sender email address), a security token, or data indicative of a requested reply format (e.g., a request for plain text data or HTML formatted data).

User device 110 may be configured to transmit one or more emails to remote request response server 120, either directly using email client software executed on user device 110 or indirectly using email client software executed at a remote location. The email transmitted to remote request response server 120 may include the request data discussed above. Moreover, as discussed above, user device 110 may transmit the one or more emails in compliance with SMTP. For example, user device 110 may push the one or more emails in compliance with SMTP to a mail server (which may be remote request response server 120, or may be communicatively accessible to remote request response server 120).

Figure 3:
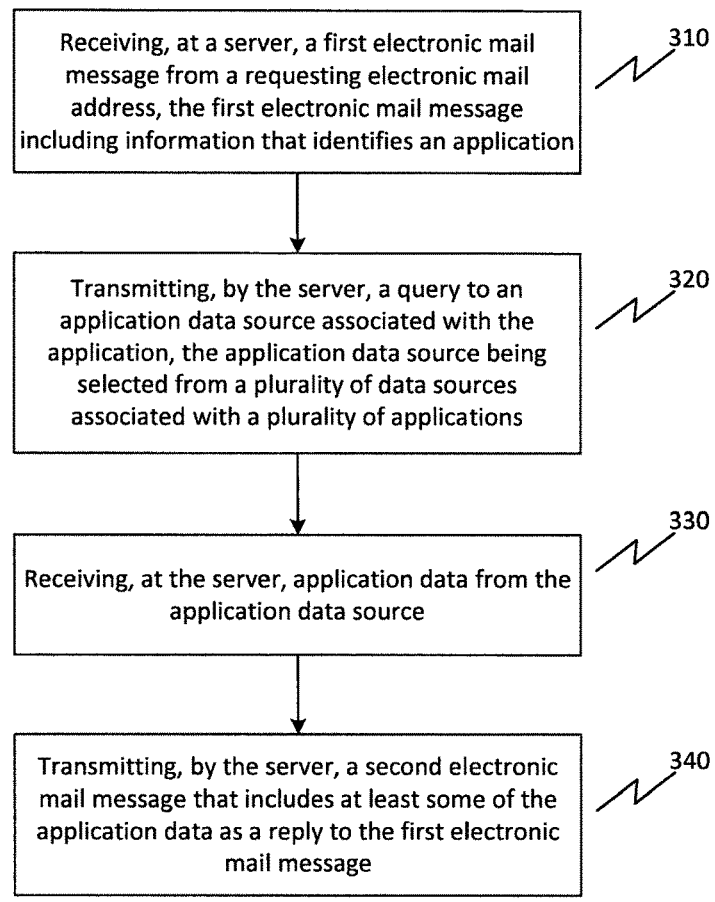
FIG. 3 is a flowchart showing an example process for processing a data and command request by a server, consistent with disclosed embodiments.

FIG. 3 illustrates an example process 300 in accordance with some embodiments. Process 300 may be implemented by, for example remote request response server 120. For example, remote request response server 120 may be configured to perform the operations of process 300 by executing software or firmware stored in memory. In some embodiments, process 300 is used to generate the second electronic mail message that is discussed in more detail below with respect to step 220 of process 200.

In some embodiments process 300 may include receiving, at a server, the first electronic mail message from a requesting electronic mail address (step 310). For example, the first electronic mail message transmitted in step 210 of process 200 may be received by remote request response server 120. For example, if remote request response server 120 includes a mail server, the first electronic mail message transmitted in step 210 of process 200 may be pushed to remote request response server 120 is compliance with a protocol, such as SMTP. In some embodiments, remote request response server 120 may verify that the first electronic mail message complies with the protocol, such as SMTP. If remote request response server 120 determines that the first electronic mail message does not comply with the protocol, such as SMTP, the first electronic mail message may not be processed as a data and command request and/or may be rejected.

Moreover, in some embodiments, remote request response server 120 may verify that the first electronic mail message is formatted in accordance with a predefined data and command request format. For example, remote request response server 120 may verify that the first electronic mail message does not include any text data in a message body. However, in some embodiments, remote request response server 120 may obtain additional information from the message body. As another example, remote request response server 120 may verify that the first electronic mail message includes information in a subject field (as discussed in more detail below) in a predefined format. If remote request response server 120 determines that the first electronic mail message does not comply with the predefined format, the first electronic mail message may not be processed as a data and command request and/or may be rejected.

As discussed above, the first electronic mail message may include information that identifies an application. For example, in some embodiments, the information that identifies an application is contained in a subject field of the first electronic mail message. Remote request response server 120 may be configured to analyze the subject line of emails received at a predetermined email address to determine the application. As described above with reference to process 200, the first electronic mail message may also include one or more application commands and one or more command parameters. Remote request response server 120 may analyze the first electronic mail message based on a format for data and command requests. For example, remote request response server 120 may extract a first set of characters in the subject field as an application, a second set of characters in the subject field as one or more application commands, and a third set of characters in the subject field as one or more application parameters. Remote request response server 120 may also, for example, extract a fourth set of characters in the subject field as one or more additional items of information (e.g., information that determines how and/or where data is returned).

The first electronic mail message may include security token data. Remote request response server 120 may be configured to analyze the security token data to determine whether to authorize a data and command request. The security token data may include, for example, a password or a randomly generated code (e.g., a code generated every 30 seconds). Remote request response server 120 may compare the received security token data to data stored by remote request response server 120 and, if a match is determined, authorize a data and command request. If a match is not determined, remote request response server 120 may be configured to send an email to the requesting email address that a data and command request has been denied.

In some embodiments, remote request response server 120 determines whether the requesting electronic mail address is authorized to send requests to the server. For example, remote request response server 120 may store a set of preauthorized email addresses. The preauthorized email addresses may be provided, for example, by an employer, users associated with the preauthorized email addresses, or any other source. For example, an authorization email may be sent by remote request response server 120 to an email address. The authorization email may contain a selectable link that, when selected, causes the email address that received the authorization email to be permanently authorized. In some embodiments, preauthorized email addresses may not need to provide a security token with data and command requests, whereas non-preauthorized email addresses may be required to provide a security token. Moreover, in some embodiments, preauthorization may be required for each application for which data and command requests may be made. Thus, if the requesting email address is a preauthorized email address, remote request response server 120 may authorize the data and command request. If the requesting email address is not a preauthorized email address, request response server 120 may be configured to send an email to the requesting email address that a data and command request has been denied.

In some embodiments, remote request response server 120 may also authenticate an email address automatically based on, for example, the originating domain of the email address (e.g. verizon.com) and may restrict requests from email addresses belonging to certain predefined originating domains.

In some embodiments, prior to receiving the first electronic mail message, remote request response server 120 may receive an initial electronic mail message from the requesting email address. The initial electronic mail message may include information that identifies a particular application and a command list request or a command that is not recognized by remote request response server 120. For example, a user associated with the requesting email address may want to obtain data associated with the application, but may not know what commands are available for the application. Remote request response server 120 may be configured to determine a list of available commands associated with the application in response to the command list request. The command list request that may be included with the initial electronic mail message may be non-specific to any application. That is, in some embodiments, the same command list request may be sent for any application, and remote request response server 120 may determine a list of commands associated with the application name sent with the command list request. For example, if the initial email message identifies the "AAA" application and includes a command list request (e.g., "COMMAND LIST"), then remote request response server 120 may identify a set of commands available for the "AAA" application. If the initial email message identifies the "BBB" application and includes the same command list request (e.g., "COMMAND LIST"), then remote request response server 120 may identify a set of commands available for the "BBB" application. Thus, remote request response server 120 may be configured to transmit an initial reply electronic mail message to the requesting electronic mail address that includes a set of application commands that may be used to retrieve data from the application data source. In some embodiments, the initial reply email message may also include a description of each of the commands in the list, parameters that may be included with each of the commands, and/or a sample email message describing in detail how each command is to be used Process 300 may also include transmitting, by the server, a query to an application data source associated with the application, the application data source being selected from a plurality of data sources associated with a plurality of applications based on the information in the first electronic mail message that identifies the application (step 320). In some embodiments, the query is generated based on the one or more application commands and one or more command parameters. For example, remote request response server 120 may store data regarding a format for queries required by each of a plurality of applications. Remote request response server 120 may be configured to generate the query to satisfy the required format. The format for a query for each type of command may be different. For example, application data source 130-1 may require a first format for a first type of command and application data source 130-2 may require a second format for a second command.

In some embodiments, the query to application data source 130 includes data representative of the command and/or parameters included in the first email message. For example, the query may include the name of the command and the parameters provided by the first email message. In such embodiments, application data source 130 may be required to analyze the command, and any parameters for the command, and identify data responsive to the command.

In other embodiments, remote request response server 120 may be configured to search application data source 130 based on the command and any parameters for the command. That is, in some embodiments, remote request response server 120 is responsible for analyzing the command and locating data within application data source 130 that is responsive to the command.

Process 300 may also include receiving, at the server, application data from the application data source (step 330). For example, in response to a query sent to application data source 130, remote request response server 120 may receive application data responsive to the query. In some embodiments, the received application data may also include an identifier indicating the query it is responsive to. For example, if remote request response server 120 sends multiple asynchronous data and command requests to one or more application data sources 130, each of the application data responses may include data associating the application data to a query.

Process 300 may also include transmitting, by the server, a second electronic mail message that includes at least some of the application data as a reply to the first electronic mail message (step 340). The second electronic mail message may be sent to, for example, the requesting email address, which may be stored while the data and command request is being processed. In some embodiments, the second electronic mail message may include all of the application data provided by application data source 130. In other embodiments, only a subset of the data provided by application data source 130 may be included in the second electronic mail message. For example, the requesting email address may be associated with an authorization level. A subset of the application data returned by application data source 130 may be included in the second electronic mail message based on the authorization level.

As discussed above, the first email message may include an additional email address different than the requesting email address. If the first email message includes an additional email address different than the requesting email address, remote request response server 120 may send the second email message to the additional email address, either exclusively or in addition to the requesting email address.

Referring again to process 200, the process may also include receiving, at the device, a second electronic mail message from the server (step 220). The second electronic mail message may include application data from an application data source selected by the server from a plurality of data sources associated with a plurality of applications. For example, the second electronic mail message sent by remote request response server 120 in step 340 of process 300 may be received at user device 110.

FIG. 6 depicts one example of a second email message that may be received by user device 110 in response to a request for data. In the example described above, the request data included an identification of an application "AAA", a command "JOB DETAILS", parameters "TechID=T00001; Date=Jun. 27, 2013", and additional information "REPLYTO=other@verizon.com". In some embodiments, the subject of the second electronic mail message matches the subject of the first electronic mail message. Alternatively, the subject of the second electronic mail message may be a subset of the first electronic mail message, or may include more information than the subject of the first electronic mail message. The additional information may also specify the format in which the second electronic mail message is to be received (e.g., Plain Text or HTML), to enable, for example, the second electronic mail message to be received on devices that do not support formatted messages.

As shown in FIG. 6, in some embodiments the second electronic mail message is sent as a reply to the email address that submitted the request for data. For example, if "requester@verizon.com" submitted the request, the second electronic mail message may be sent to, and received by, "requester@verizon.com". As shown in FIG. 6, the message body of the second email message may include information responsive to the request data. For example, the data may be provided from a data source associated with application "AAA" using command "JOB DETAILS". The data may be limited to data associated with "TechID=T00001" and "Date=Jun. 27, 2013". In the example shown in FIG. 6, the data in the second email message includes a Job identifier, a Job status (e.g., complete or incomplete), a departure date and time associated with the Job (e.g., a date and time associated with when a technician began a Job), an arrival date and time associated with the Job (e.g., a date and time associated with when a technician finished a Job), a Job type, and the number of minutes spent by a technician on a Job. In some embodiments, the server may automatically return data that is specific only to the requester. For example, if TechID T00001 is associated with the email address requester@verizon.com in the application data source, the first electronic mail message need not contain the TechID parameter and the Remote Request Response Server 120 may automatically return data that is pertinent to the requester.

In some embodiments, the application data that is returned may be masked and/or encrypted, as necessary, to hide any sensitive information (e.g., a social security number). The masking and/or encryption may be performed at application data source 130 or remote request response server 120.

Figure 7:
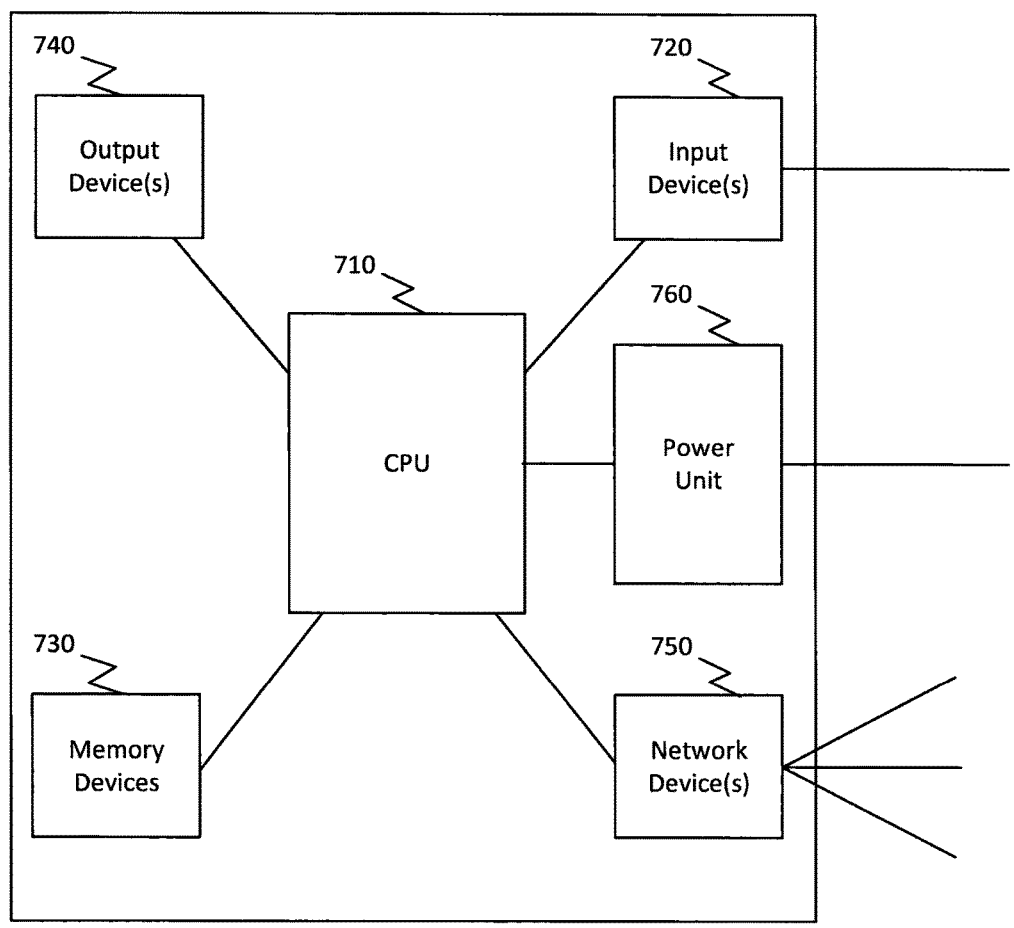
FIG. 7 is a diagram of an example electronic device for use in implementing disclosed devices.

FIG. 7 is an exemplary computing device 700, consistent with disclosed embodiments. Variations of computer device 700 may be used for implementing any or all of user device 110, remote request response server 120, and application data source 130.

As shown in FIG. 7, exemplary computer device 700 may include one or more central processing units 710 for managing and processing data and operations consistent with the disclosed embodiments. CPU 710 may be configured to process data, execute software instructions stored in memory, and transmit data between the other components of device 700. For example, CPU 710 may be implemented as a mobile microprocessor, a desktop microprocessor, a server microprocessor, or any other type of processor.

In some embodiments, computer device 700 may also include one or more input devices 720, which are configured to receive input from a user, other computers, other devices, or other modules. Input devices 720 may include, but are not limited to, keyboards, mice, trackballs, trackpads, scanners, cameras, external storage or information devices, and other devices, which connect via Universal Serial Bus (USB), serial, parallel, infrared, wireless, wired, or other connections.

Computer device 700 may also include one or more memory devices 730. Memory devices 730 may be comprise optical, magnetic, signal, or any other type of memory configured to store information. Memory devices 730 may store, for example, data, instructions, programs/applications, operating systems, or a combination of these.

Computer device 700 also includes one or more output devices 740 that may be configured to transmit data to users and/or modules or devices. Such modules or devices may include, but are not limited to, computer monitors, televisions, screens, interface ports, projectors, printers, plotters, and other recording/displaying devices which connect via wired or wireless connections.

Computer device 700 may also include one or more network devices 750. Network device 750 may be configured to allow computer device 700 to connect to and exchange information with networks, such as the Internet, a local area network, a wide area network, a cellular network, a wireless network, or any other type of network. Network device 750 may be implemented as a wired network adapter, a wireless network adapter, an infrared network adapter, a cellular or satellite network adapter, or any other type of network adapter.

Computer device 700 may also include one or more power units 760, which may enable computer device 700 and its components to receive power and operate. While FIG. 7 illustrates the components in FIG. 7 as connected to CPU 710, other connections and configurations are possible, such as a "bus" or other connective links. Additionally, while the devices in FIG. 7 are represented in a singular form, in some embodiments, more than one of each of the devices in FIG. 7 may be implemented.

While FIG. 7 illustrates the components in FIG. 7 as connected to CPU 710, other connections and configurations are possible, such as a "bus" or other connective links. Additionally, while the devices in FIG. 7 are represented in a singular form, in some embodiments, each of the devices in FIG. 7 may be omitted, duplicated, or substituted.

While several embodiments are described above in the context of email communication, other embodiments may utilize other forms of communication to send requests from user devices and send data from a server. For example, user device 110 may transmit a text message containing a data and command request, formatted in the same or substantially the same manner as described above for data and command requests (e.g., an application name, command, command parameters, and additional information may be included in a message body and/or subject of a text message), to a telephone number associated with remote request response server 120. Remote request response server 120 may then determine data responsive to the data and command request and transmit the results back in a text message (or in an email) to a telephone number associated with user device 110.

Various embodiments have been described with reference to the accompanying drawings and embodiments. It will, however, be evident that various modifications and changes may be made thereto, and additional embodiments may be implemented, without departing from the present disclosure. The specification and drawings are accordingly to be regarded in an illustrative rather than restrictive sense.

For example, advantageous results may still be achieved if steps of the disclosed methods were performed in a different order and/or if components in the disclosed systems were combined in a different manner and/or replaced or supplemented by other components. Advantageous results may still be achieved if values or data were different than explicitly disclosed. Other implementations are also within the scope of the present disclosure.

It is to be understood that both the foregoing general description and the following detailed description are exemplary and explanatory only and are not restrictive of the disclosed embodiments, as claimed. Note also that, as used herein, the indefinite articles "a" and "an" mean "one or more" in open-ended claims containing the transitional words "comprising," "including," and/or "having."

The accompanying drawings, which are incorporated in and constitute a part of this specification, illustrate one or more embodiments and together with the description, serve to explain certain aspects of the disclosed embodiments.

What is claimed is:

1. A method, comprising:

receiving, by a server device, a first electronic mail message from a requesting electronic mail address,
the first electronic mail message including:
information identifying a particular application, and
a command list request;

transmitting, by the server device, a reply to the first electronic mail message including a set of commands for the particular application;

receiving, by the server device, a second electronic mail message from the requesting electronic mail address,
the second electronic mail message including:
a subject field,
the subject field identifying a plurality of commands, of the set of commands, and the particular application,
a body, and
security token data that includes a randomly generated code;

verifying, by the server device, that the body of the second electronic mail message is formatted in accordance with a predefined request format by determining that the body of the second electronic mail message includes only data other than text data;

analyzing, by the server device, the security token data to determine whether a request associated with the second electronic mail message is authorized;

transmitting, by the server device and based on a positive verification and authorization of the request, a query to an application data source associated with the particular application,
the application data source being selected from a plurality of data sources associated with a plurality of applications based on the subject field identifying the particular application;

receiving, by the server device, application data from the application data source; and transmitting, by the server device, a third electronic mail message that includes at least a portion of the application data as a reply to the second electronic mail message,
the portion of the application data being included based on an authorization level associated with the requesting electronic mail address.

2. The method of claim 1, wherein the second electronic mail message further includes one or more command parameters.

3. The method of claim 2, wherein the query is generated based on the plurality of commands and the one or more command parameters.

4. The method of claim 1, wherein the subject field of the second electronic mail message further includes:
an additional electronic mail address different than the requesting electronic mail address, and
wherein transmitting the third electronic mail message includes:
transmitting the third electronic mail message to the additional electronic mail address.

5. The method of claim 1, further comprising:
determining whether the requesting electronic mail address originates from a predefined domain; and
selectively:
determining, based on determining that the requesting electronic mail address originates from the predefined domain, that the requesting electronic mail address is authorized to send requests to the server device, or
sending, based on determining that the requesting electronic mail address does not originate from the predefined domain, a denial electronic mail to the requesting electronic mail address.

6. The method of claim 1, further comprising:
storing a set of preauthorized electronic mail addresses; and
determining, based on the set of preauthorized electronic mail addresses, whether the requesting electronic mail address is authorized to send requests to the server device associated with the particular application.

7. The method of claim 1, further comprising:
determining that the second electronic mail message includes the command list request; and
transmitting, based on determining that the second electronic mail message includes the command list request, a reply electronic mail message that includes a set of application commands for retrieving data from the application data source.

8. A system, comprising:
a memory storing instructions; and
one or more processors to execute the instructions to:
receive a first electronic mail message from a requesting electronic mail address,
the first electronic mail message including:
information identifying a particular application, and
a command list request;
transmit a reply to the first electronic mail message including a set of commands for the particular application;
receive a second electronic mail message from the requesting electronic mail address,
the second electronic mail message including:
a subject field and a body,
the subject field identifying a plurality of commands, of the set of commands, and the particular application, and
security token data including a randomly generated code;
verify that the body of the second electronic mail message is formatted in accordance with a predefined request format by determining that the body of the second electronic mail message includes only data other than text data;
analyze the security token data to determine whether a request associated with the second electronic mail message is authorized;
transmit, based on a positive verification and authorization of the request, a query to an application data source associated with the particular application,
the application data source being selected from a plurality of data sources associated with a plurality of applications based on the subject field identifying the particular application;
receive application data from the application data source; and
transmit a third electronic mail message that includes at least a portion of the application data as a reply to the second electronic mail message,
the portion of the application data being included based on an authorization level associated with the requesting electronic mail address.

9. The system of claim 8, wherein the second electronic mail message further includes one or more command parameters.

10. The system of claim 9, wherein the query is generated based on the set of commands and the one or more command parameters.

11. The system of claim 8, wherein the subject field of the second electronic mail message further includes:
an additional electronic mail address different than the requesting electronic mail address, and
wherein the one or more processors, when transmitting the third electronic mail message are to:
transmit the third electronic mail message to the additional electronic mail address.

12. The system of claim 8, further comprising:
determining whether the requesting electronic mail address originates from a predefined domain; and
selectively:
determining, based on determining that the requesting electronic mail address originates from the predefined domain, that the requesting electronic mail address is authorized to send requests to a server device; or
sending, based on determining that the requesting electronic mail address does not originate from the predefined domain, a denial electronic mail to the requesting electronic mail address.

13. The system of claim 8, wherein the one or more processors are further to:
store a set of preauthorized electronic mail addresses; and
determine, based on the set of preauthorized electronic mail addresses, whether the requesting electronic mail address is authorized to send requests to a server device associated with the particular application.

14. The system of claim 8, wherein the one or more processors are further to:
determine that the second electronic mail message includes the command list request; and
transmit, based on determining that the second electronic mail message includes the command list request, a reply electronic mail message that includes a set of application commands for retrieving data from the application data source.

15. A method, comprising:
transmitting, by a device, a first electronic mail message using a requesting electronic mail address,
the first electronic mail message including:
information identifying a particular application, and
a command list request;
receiving, by the device, a reply to the first electronic mail message including a set of commands for the particular application;
transmitting, by the device, a second electronic mail message to a server device,
the second electronic mail message including a subject field,
the subject field identifying:
a plurality of commands of the set of commands,
an application, and
an additional electronic mail address different than the requesting electronic mail address, and
the second electronic mail message including security token data,
the security token data including a randomly generated code; and
receiving, by the device, a third electronic mail message from the server device,
the third electronic mail message including application data from an application data source selected by the server device from a plurality of data sources associated with a plurality of applications,
the application data being included based on an authorization level of the requesting electronic mail address.

16. The method of claim 15, wherein the second electronic mail message further includes one or more command parameters.

17. A non-transitory computer-readable medium storing instructions comprising:
one or more instructions that, when executed by at least one processor, cause the at least one processor to:
receive a first electronic mail message from a requesting electronic mail address,
the first electronic mail message including:
information identifying a particular application, and
a command list request;
transmit a reply to the first electronic mail message including a set of commands for the particular application;
receive a second electronic mail message from the requesting electronic mail address,
the second electronic mail message including:
a subject field and a body,
the subject field identifying a plurality of commands, of the set of commands, and the particular application, and
security token data including a randomly generated code;
verify that the body of the second electronic mail message is formatted in accordance with a predefined request format by determining that the body of the second electronic mail message includes only data other than text data;
analyze the security token data to determine whether a request associated with the second electronic mail message is authorized;
transmit, based on a positive verification and authorization of the request, a query to an application data source associated with the particular application,
the application data source being selected from a plurality of data sources associated with a plurality of applications based on the subject field identifying the particular application;
receive application data from the application data source; and
transmit a third electronic mail message that includes at least a portion of the application data as a reply to the second electronic mail message,
the portion of the application data being included based on an authorization level associated with the requesting electronic mail address.

18. A non-transitory computer-readable medium storing instructions comprising:
one or more instructions that, when executed by at least one processor, cause the at least one processor to:
transmit a first electronic mail message using a requesting electronic mail address,
the first electronic mail message including:
information identifying a particular application, and
a command list request;

receive a reply to the first electronic mail message including a set of commands for the particular application;

transmit, from the requesting electronic mail address, a second electronic mail message to a server device, the second electronic mail message including:
- a subject field identifying a plurality of commands of the set of commands,
- an application,
- an additional electronic mail address different than the requesting electronic mail address, and
- security token data including a randomly generated code; and receive, at the requesting electronic mail address or the additional electronic mail address, a third electronic mail message from the server device,
- the third electronic mail message including application data from an application data source selected by the server device from a plurality of data sources associated with a plurality of applications, the application data being included based on an authorization level of the requesting electronic mail address.

19. The method of claim 1, wherein the randomly generated code is generated at a periodic interval.

20. The method of claim 15, wherein the reply to the first electronic mail message further includes:
a sample electronic mail message describing how each command, of the set of commands, is to be used.

* * * * *